ERROR-CHECKING CIRCUIT FOR A DATA TRANSMISSION SYSTEM
Filed Nov. 22, 1960
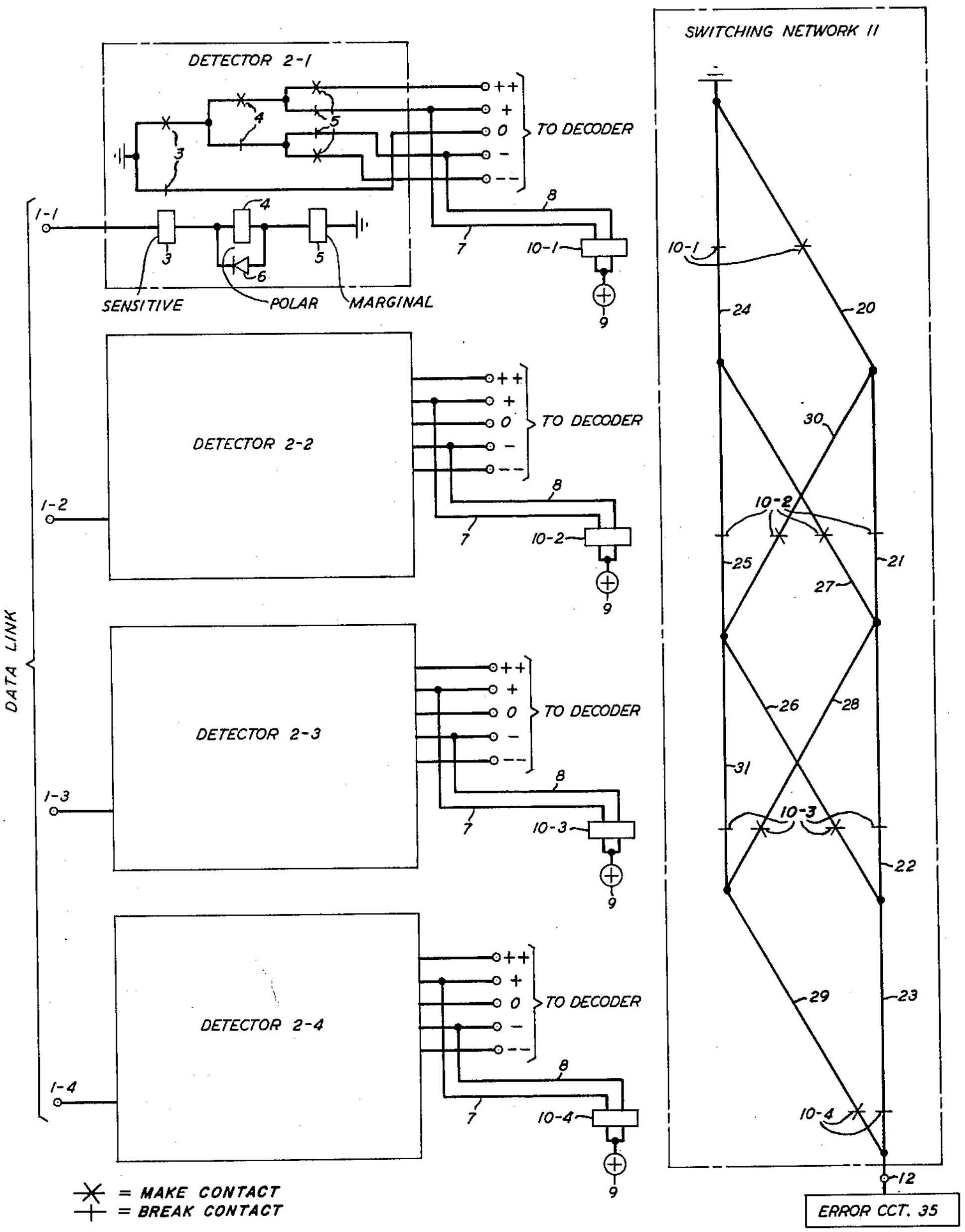
EACH RELAY CONTACT BEARS THE DESIGNATION OF ITS CONTROLLING RELAY
INVENTORS R. G. TAYLOR, JR.
J. H. VOGELSONG
BY S E Hollander
ATTORNEY United States Patent Office 3,140,463
Patented July 7, 1964

3,140,463
ERROR-CHECKING CIRCUIT FOR A DATA TRANSMISSION SYSTEM

Robert G. Taylor, Jr., Paramus, and James H. Vogelsong, Madison, N.J., assignors to Bell Telephone Laboratories, Incorporated, New York, N.Y., a corporation of New York Filed Nov. 22, 1960, Ser. No. 71,075
13 Claims. (Cl. 340—146.1)

This invention relates to multilevel data transmission systems and, more particularly, to parity checking schemes for detecting the proper operation thereof.

Data transmission systems, heretofore, have most often transmitted binary information. An example of such a system and one to which this invention is applicable is a telephony system wtherein a common control unit serves many private branch exchanges. The common control transmits switching instructions sequentially to each of the exchanges via data links associated with each exchange. If a single data path is used, binary serial information is communicated. If two or more paths are available, the binary information is transmitted in parallel form. In both cases it is desired to check the accuracy of the data transmitted. Parity checking schemes for these types of data transmission systems are well known in the art. These schemes are generally based on the following principle: If the total number of digits in each code word is $n$ there are $2^n$ possible code words. Of these only some are designated as valid. The remaining ones are termed invalid. The information to be communicated is represented by the valid code words. An error in transmission hopefully results in an invalid code word which alerts the receiver that the information received is incorrect.

These schemes in which binary signals are transmitted are less efficient than systems in which more than two levels or multilevel transmission is possible. For example, suppose it is necessary to transmit 128 information words through a data link; suppose further it is decided that there be an equal number of valid and invalid code words. For there to be 256 possible code words, it is necessary in a binary system to have eight successive serial digits or eight parallel lines ($2^8=256$). On the other hand, if sixteen signal levels are possible, it is necessary to use only two successive serial digits or two parallel lines to obtain the same 256 code words ($16^2=256$). Thus, one-quarter the number of digits or lines in a binary system are necessary in a sixteen-level signaling system.

Although multilevel signaling is more efficient in this manner, the most widely used data transmission systems incorporate binary signaling. This is due to the fact that the parity checking circuits for binary signals are simpler than corresponding parity checking circuits for multilevel systems because bistable devices are more universal than devices with more than two stable states. A simple checking circuit for a multilevel data transmission system has long been desired. This invention is such a parity checking circuit for a multilevel data transmission system utilizing any number of lines with any number of possible signal levels therein.

There are many types of parity checking systems. Most of these are single error-detecting devices. When referred to binary signaling, this means that an error in transmission causing a single digit to be changed from a zero to a one, or vice versa, causes the valid code word to become invalid. These systems are single error-detecting circuits rather than single error-correcting circuits because the error is only detected but cannot be corrected by the receiver. A signal must be sent back to the transmitter to repeat the information.

This invention is a single error-detecting circuit. When referred to multilevel signal systems, however, a "single error" must be defined. In a multiline data link in which any one of a plurality of successive current or voltage levels may appear in each line, a "single error" is defined as the transformation of a voltage or current level to an adjacent voltage or current level in only one line. Thus, in a five-level system with four lines the transformation of the valid code word 2354 into 2344 is a single error. The mutation of 2354 to 2334 is not considered a single error because the digit in which the error occurred has exhibited a change from one level to another two levels away. The transformation of 2354 into 2444 is similarly not a single error because an error has occurred in more than one digit.

In a multilevel data transmission, it is obvious that the most common error will be a single error of the type described above. It is considerably more probable that a voltage or current level will be transformed to an adjacent level rather than to a distant level. For this reason, in a multilevel data transmission system, it is highly desirable that all valid code words differ by at least two levels in at least one digit. A single error should always result in an invalid code word in such a system. This invention is a parity checking circuit which detects single errors of the type defined above in which all valid code words are separated from each other by at least two levels in at least one digit.

An object of this invention is to provide improved data transmission systems.

It is another object of this invention to detect single errors in multilevel transmitted data.

It is another object of this invention to cause all valid code words to be separated from each other by at least two levels in at least one digit.

Briefly, in accordance with an illustrative embodiment of this invention, the parallel data transmission system utilizes four lines with one of five possible currents in each. These currents will be designated by the numbers 2, 3, 4, 5 and 6. These numbers do not necessarily represent specific voltage or current magnitudes but, instead, merely indicate successive levels with alternate "odd" and "even" weightings. A detector is connected to each of the four lines and is operative in response to the appearance of level 3 or 5 in each of the respective lines. The detectors operate respective relays associated with the lines. Levels 3 and 5 alone cause the relays to be energized. The four relays close contacts in a network of the type in which an output signal is obtained if, and only if, an odd number of relays are operated. Because the relays are energized only in response to odd digits (levels), an output signal is obtained only if the transmitted code word contains an odd number of odd digits, that is to say, the sum of the code word digits is odd.

Code words containing this odd sum of digits are invalid and the output signal alerts the receiver that an error has occurred in transmission. In accordance with the illustrative embodiment of our invention approximately half of the possible $5^4$ or 625 code words are valid. Each of the valid code words is separated from each of the other code words by at least two levels in at least one digit. This arrangement detects all single errors. In addition, this structural arrangement is applicable to all multilevel data transmission systems containing any number of lines with any number of current or voltage levels therein.

A specific example at this time will illustrate the operation of the circuit. The word 3625 is a valid code word because the sum of its digits is even. A single error, i.e., the transformation in only one digit to an adjacent level, would result in one of the following code words: 2625, 4625, 3525, 3635, 3624, or 3626. All invalid code words contain an odd number of odd digits, that is, an odd sum of digits. It will be observed that each of the code words resulting from a single error in the valid code word 3625 is invalid. The parity checking circuit which always initiates an error signal upon the transmission of an odd number of odd weighted digits would thus cause an error indication to occur for all single errors in the valid code word 3625.

Because the parity checking circuit is constructed to operate the error circuit only upon the appearance of an odd number of odd digits in the data link, it is easily demonstrated that all valid code words are different from each other by at least a separation of two levels in one digit or a separation of one level in at least two digits. This is significant in understanding the instant invention. If errors do occur it is most probable that only one digit has been changed. It is also most likely that the digit level has been transformed into an adjacent one, i.e., a single error. In order for a valid code word to be transformed into another valid word (highly undesirable for the error is not detected) the sum of digits in the new word must also be even. This can occur if one digit changes by an even number of levels, two digits change by either an even or odd number of levels in each, or three or more digits change in various combinations. It is obvious that the most likely of all these possibilities would be those involving the least change, that is, a change in one digit of two levels or a change in two digits of one level in each. All valid code words are separated by at least these amounts. Since data transmission equipment can be constructed sufficiently reliably so that at most one digit will change by at most one level, it is seen that errors in the data transmission system associated with the instant parity checking circuit will almost always be single errors and, if so, will always result in invalid code words which will be detected.

Further objects, features and advantages of the instant invention will become apparent from consideration of the following detailed description and the accompanying drawing in which an illustrative embodiment of the invention is disclosed.

As shown in the drawing, the four input terminals, 1–1 to 1–4, to the parity checking circuit are connected to the four channels in the data link. There is an identical detector 2 connected to each of the input terminals 1. Each detector 2 consists of a relay tree in which the common ground terminal can be connected to only one of five output lines (++, +, 0, −, −−) depending on the contacts closed by relays 3, 4 and 5.

The input currents to the detectors 2 in this particular embodiment are either a heavy positive (++, 6, even), a heavy negative (−−, 2, even), light positive (+, 5, odd), light negative (−, 3, odd), or no current at all (0, 4, even). Depending on the magnitude and direction of the current flowing through a particular channel in the data link, a particular one of the five output lines in each detector 2 is connected to ground. The decoder, not shown in the drawing, interprets the four grounded lines, one line in each group of five, according to the coding of the information.

Relay 3 in each of the detectors 2 is a sensitive relay for detecting the presence of any off-ground signal. If the particular data link contains no current (0) the lower path in the relay tree remains closed, and output line 0 is grounded. The presence of any nonzero current in the data channel operates the sensitive relay 3 and the grounded common terminal can be connected via the top branch of the two branches associated with relay 3 to one of the other four output lines. Relay 4 is made polar by shunting its coil by diode 6. This relay detects whether a positive current (++ or +) or a negative current (−− or −) is present in the channel. Negative currents are shorted by the diode 6 and relay 4 remains inoperative. When relay 3 is operated the lower of the two branches associated with relay 4 is connected to the common ground terminal and either of the two lines representing light and heavy-negative currents may be connected to ground depending on the operation of relay 5. Similar remarks apply to the two lines representing the two positive currents. Relay 5 is a marginal relay and distinguishes between light and heavy signals of either polarity. Light signals in either direction leave this relay unoperated and either the line representing the light-positive or the line representing the light-negative current is chosen depending on the operation of polar relay 4. Heavy currents of either polarity energize relay 5 and either the line representing the heavy-positive or the heavy-negative current is grounded again depending on the operation of relay 4.

Thus, the appearance of a particular one of five current levels in each of the four data channels causes one of a particular five lines in each detector 2 to be connected to ground. The light-positive and light-negative currents and lines are interpreted as the odd weighted digits. The remaining three levels and lines represent even weighted digits. Only one line in each of the four groups representing the four digits of the code word can be grounded at any one time. Conductor 7 is attached to the coil of relay 10 in each group and connects source 9 to the line which is grounded when a light-positive current appears in the data channel. Similar remarks apply to the conductor 8 connected to the line representing the light-negative current in each detector. When either of the above-mentioned two lines are grounded, current flows from the source 9, through conductor 7 or 8, and through the relay tree to ground. Relays 10–1 to 10–4 are operated when this current flows. Thus, the relay 10 associated with each of the four lines is operated only upon the appearance of a light-positive or light-negative current, in other words, upon the appearance of an odd weighted digit.

It will be convenient, as described above, to represent the five current levels by the digits 2, 3, 4, 5 and 6. The heavy-positive current will be represented by the digit 6, the light-positive current by the digit 5, the 0 current level by the digit 4, the light-negative current by the digit 3, and the heavy-negative current by the digit 2. Thus, the operation of the circuits may be interpreted by stating that only the odd digits 3 and 5 in each of the data channels operate the relays 10–1 to 10–4.

The switching network 11 can connect the terminal 12 to ground via one of many possible paths depending on the operation of relays 10–1 to 10–4. This connection is made only upon the operation of an odd number of the relays 10–1 to 10–4. The contacts in the switching network 11 operative in response to the associated relays 10 are shown in the drawing opposite these relays.

In the normal state where no currents appear on the data channels (representing the code word 4444) there is no closed path connecting terminal 12 to ground. The operation of any one of relays 10 completes a path. For example, if relay 10–1 is energized (in response to digit 3 or 5 in the first channel of the data link) a closed path is completed connecting ground to terminal 12 through branches 20, 21, 22 and 23. The operation of only relay 10–3 in response to digit 3 or 5 in the third channel of the data link connects terminal 12 to ground through branches 24, 25, 26 and 23. Similar paths may be traced out for the operation of any individual relay 10.

The energization of any two of the relays 10 does not connect terminal 12 to ground. For example, suppose relays 10–2 and 10–3 are energized in response to the appearance of a three or five in each of the second and third channels of the data link. The only path that can be traced from ground through closed contacts consists of branches 24, 27, and 28. This path is not completed because branch 29 contains open contacts.

The energization of any three of the relays 10, as does the energization of only one, connects terminal 12 to ground. In the previous example, if relay 10–4 is also energized the path is closed through branch 29. Similar paths may be traced for the energization of any three of the four relays 10.

Finally, the energization of all four relays provides no closed path from terminal 12 to ground. Ground potential appears on branches 20, 30 and 26. But branch 23 now contains open contacts and the path cannot be completed to terminal 12.

Terminal 12, when grounded, operates the error circuit 35. The operation of this error circuit alerts the decoder that an invalid code word has been transmitted. It is obvious from the above description that the error circuit is operated only upon the energization of an odd number of relays 10. These relays, in turn, are energized only upon the appearance of digits 3 or 5 in the respective channels of the data link. Thus, the invalid code words consist of those words containing an odd number of odd digits. This necessarily implies that the sum of the digits in each invalid code word is odd. Thus, the class of valid code words consists of those words whose sum of digits is even.

In the embodiment shown there are four lines each containing one of a possible five current levels. This results in $5^4$ or 625 combinations of digits or code words. Of this total, 313, approximately half of the total have an even sum of digits. Thus, there are 313 valid code words among the total 625.

A specific example of the mechanism whereby the transformation of a valid code word into an invalid code word operates the error circuit 35 may be analyzed by considering the transformation of valid code word 2345 (whose sum of digits is the even number 14) into the invalid code word 2445 (whose sum of digits, 15, is odd). The valid code word operates the contacts associated with relays 10–2 and 10–4 because only digits 3 and 5 cause relays 10 to be energized. Terminal 12 is not grounded because the path begun by branches 24, 27 and 22 is not completed due to the open contacts in branch 23. However, the error in transmission results in the operation of only relay 10–4 (due to digit 5). Terminal 12 is then connected to ground through branches 24, 25, 31 and 29.

A single error in the valid code word 2345 results in one of the following code words: 3345, 2245, 2445, 2335, 2355, 2344, or 2346. All of these most probable occurring errors are detected because the appearance of each of these invalid code words on the data link connects terminal 12 to ground and causes the error circuit 35 to be operated. The paths completed from ground to terminal 12 for each of these invalid code words resulting from a single error in valid code word 2345 are tabulated below:

| Invalid Code Word Resulting From a Single Error in Valid Code Word 2345 | Branches Connecting Terminal 12 to Ground in Switching Network 11 |
|---|---|
| 3345 | 20, 30, 31, 29 |
| 2245 | 24, 25, 31, 29 |
| 2445 | 24, 25, 31, 29 |
| 2335 | 24, 27, 28, 29 |
| 2355 | 24, 27, 28, 29 |
| 2344 | 24, 27, 22, 23 |
| 2346 | 24, 27, 22, 23 |

The most common type of error in multilevel data transmission systems is the transformation of a current level to an adjacent level. If this occurs in only one line, the error has been defined as a single error. The case above is such an example. This is the type of error detected by the parity checking circuit.

Certain relatively rarely occurring types of errors are not detected by applicants' invention. For example, the transformation in a valid code word of one digit of an odd or even weighting into a digit of the same weighting results in the operation of the same relays 10. This error obviously cannot be detected. Similarly, the transformation in any valid code word of two digits into two other digits having the same weightings operates an even number of relays and the error is undetected. However, these errors, a pump of at least two levels in one digit or an error in two digits, are uncommon. Worse errors such as the transformation of three or four digits or a jump of more than two levels are even more uncommon. The circuit detects all of the most probable occurring errors, these being single errors of the type defined above.

A decisive advantage of this circuit lies in the fact that the system can be expanded to any number of channels each of which may contain any one of many possible current levels. Odd and even weightings are assigned to alternate current levels in each line. The relay trees in detectors 2 are branched still further and only those output lines which are grounded due to the appearance of an odd digit in the particular channel operate the particular relay 10. The switching network 11 is similarly extended by the inclusion of additional segments such as that defined by branches 22, 26, 28 and 31 for each of the additional relays 10. The switching network 11 will connect terminal 12 to ground only upon the energization of an odd number of relays 10 independent of the total number of such relays. The relays 10 themselves are operative only in response to odd digits, independent of the total number of possible digits in each channel. Thus, the error circuit is still alerted only when the transmitted code word contains an odd number of odd digits, that is to say, when the sum of its digits is odd. All single errors are detected independent of the size of the data transmission system.

It is understood that the specific embodiment of the invention shown and described is only illustrative and various modifications may be made therein without departing from the spirit and scope of the invention.

What is claimed is:

1. A parity checking circuit for a data transmission system comprising a data link having a plurality of lines, each of said lines being adapted to carry one of a plurality of signal levels indicative of a digit or character, detector means individual to said lines including discriminating means for identifying the digits or characters represented by said signal levels in said lines, additional detector means individual to said lines and operative in response to predetermined alternate ones of said signal levels, and a switching network operative in response to the energization of one or more predetermined numbers of said second detector means.

2. A parity checking circuit for a transmission system comprising a data link having a plurality of lines, each of said lines being adapted to carry one of a plurality of signal levels indicative of a digit or character, detector means individual to said lines including discriminating means for identifying the digits or characters represented by said signal levels in said lines, additional detector means individual to said lines and operative in response to predetermined alternate ones of said signal levels, and a switching network operative in response to the energization of predetermined odd numbers of said second detector means.

3. A single error-detecting device for a data transmission system including a data link having a plurality of lines each with one of a plurality of signal levels therein representative of a digit or character, first detector means connected to said lines for identifying the digits or characters represented by said signal levels, second detector means connected to said first detector means and operative responsive to predetermined identifications by said first detector means, said predetermined identification including digits represented by every other signal level beginning with the second lowest signal level, switching network means responsive to the operation of predetermined odd numbers of said second detector means, and error circuit means connected to said switching network means for indicating the actuation of predetermined odd numbers of said second detector means.

4. A parity checking circuit including a data link comprising a plurality of lines adapted to carry a multiplicity of current levels, said levels representing digits according to a code wherein alternate levels represent odd and even digits, first detector means connected to said lines for identifying said digits represented by said current levels, second detector means connected to said first detector means and operative responsive to the identification of odd digits by said first detector means, switching network means actuated by said second detector means in response to the operation of an odd number of said second detector means, and error circuit means connected to said switching network means for indicating the operation of an odd number of said second detector means.

5. A parity checking circuit for a data transmission system including a data link having a plurality of lines adapted to carry a plurality of current levels, said current levels being representative of digits according to a code wherein alternate levels represent odd and even digits respectively, all of said digits represented by said current levels on said lines collectively indicating a particular code word, said code word being arbitrarily determined to be valid if the sum of said digits is even and invalid if the sum of said digits is odd, first detector means individual to said lines for identifying the digits represented by said current levels on said lines, second detector means connected to said first detector means and operative responsive to the identification of odd digits by said first detector means, switching network means responsive to the operation of an odd number of said second detector means, and error circuit means controlled by said switching network means to indicate the operation of an odd number of said second detector means, said indication representing an invalid code word.

6. A parity checking circuit in accordance with claim 5 wherein said first detector means includes a plurality of output terminals individual to said digit identifications, a sensitive relay, a marginal relay and a polar relay, said relays being connected in series with said lines, and a plurality of contacts arranged in relay tree formation and controlled by said relays for actuating a particular one of said output terminals indicative of said digit representation.

7. A parity checking circuit in accordance with claim 6 wherein said second detector means includes relay means connected to said output terminals individual to said odd digit identifications of said first detector means.

8. A parity checking circuit in accordance with claim 7 wherein said switching network includes a plurality of contact sets controlled by said second detector means.

9. A single error-detecting device for a data transmission system having a multiplicity of lines each with one of a multiplicity of current levels therein comprising relay means individually connected to each of said lines and operative in response to every other current level beginning with the second lowest, an error circuit, and a switching network including multicontact switching means operative in response to the energization of an odd number of said relay means for alerting said error circuit.

10. A single error-detecting device for a data transmission system having a multiplicity of lines each with one of a multiplicity of signal levels therein comprising detecting means individually connected to each of said lines and operative in response to every other of said signal levels, and a check network operative in response to the energization of said detecting means for determining the operation of an odd number of said detecting means.

11. A parity checking device for a data transmission system having a multiplicity of lines each with one of a multiplicity of signal levels therein comprising detector means individually connected to each of said lines and operative in response to every other of said signal levels, an error circuit, and a logic network operative in response to the energization of one or more predetermined numbers of said detector means for alerting said error circuit.

12. A parity checking circuit for a data transmission system having a plurality of lines each with one of a multiplicity of current levels therein comprising a detector connected to each of said lines, said detectors having a sensitive relay, a polar relay and a marginal relay connected in series with said lines, a multicontact tree, said relays being operative in response to said line currents for closing various ones of said contacts on said tree, a source of reference potential, a plurality of output terminals, said relay tree connecting said source of reference potential to one of said terminals depending on the magnitude and polarity of said line current, a relay associated with each of said detectors, said associated relays being operative in response to the connection of said source of reference potential to predetermined ones of said terminals, multicontact switching network means, and an error circuit, said multicontact switching network means causing the operation of said error circuit upon the energization of an odd number of said associated relays.

13. A combination in accordance with claim 12 wherein said predetermined ones of said terminals include those terminals connected to said reference potential upon the appearance of alternate ones of said current levels in each of said lines.

References Cited in the file of this patent

UNITED STATES PATENTS

| | | |
|---|---|---|
| 2,552,629 | Hamming et al. | May 15, 1951 |
| 3,011,148 | Sauter | Nov. 28, 1961 |